United States Patent
Morrison et al.

(10) Patent No.: US 6,984,277 B2
(45) Date of Patent: Jan. 10, 2006

(54) BOND ENHANCEMENT FOR THERMALLY INSULATED CERAMIC MATRIX COMPOSITE MATERIALS

(75) Inventors: Jay Alan Morrison, Orlando, FL (US); Gary Brian Merrill, Orlando, FL (US); Thomas Barrett Jackson, San Diego, CA (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 33 days.

(21) Appl. No.: 10/631,277

(22) Filed: Jul. 31, 2003

(65) Prior Publication Data

US 2005/0022921 A1 Feb. 3, 2005

(51) Int. Cl.
B32B 31/10 (2006.01)
B32B 31/12 (2006.01)
(52) U.S. Cl. .................. 156/89.11; 156/237; 156/278; 156/279; 427/203
(58) Field of Classification Search ............. 156/89.11, 156/89.26, 89.27, 237, 242, 245, 276, 278, 156/279, 280, 289, 298; 427/180, 202, 203, 427/205, 206
See application file for complete search history.

(56) References Cited

U.S. PATENT DOCUMENTS

| | | | |
|---|---|---|---|
| 4,808,461 A | 2/1989 | Boyce et al. | |
| 4,875,616 A | 10/1989 | Nixdorf | |
| 5,186,776 A | 2/1993 | Boyce et al. | |
| 5,308,463 A | 5/1994 | Hoffmann et al. | |
| 5,441,762 A * | 8/1995 | Gray et al. | 427/190 |
| 5,466,506 A | 11/1995 | Freitas et al. | |
| 5,589,015 A | 12/1996 | Fusco et al. | |
| 5,624,622 A | 4/1997 | Boyce et al. | |
| 5,648,123 A | 7/1997 | Kuhn et al. | |
| 5,667,859 A | 9/1997 | Boyce et al. | |
| 5,736,222 A | 4/1998 | Childress | |
| 5,741,574 A | 4/1998 | Boyce et al. | |
| 5,789,061 A | 8/1998 | Campbell et al. | |
| 5,800,672 A | 9/1998 | Boyce et al. | |
| 5,832,594 A | 11/1998 | Avila | |
| 5,862,975 A | 1/1999 | Childress | |
| 5,868,886 A | 2/1999 | Alston et al. | |
| 5,869,165 A | 2/1999 | Rorabaugh et al. | |
| 5,876,540 A | 3/1999 | Pannell | |
| 5,876,652 A | 3/1999 | Rorabaugh et al. | |
| 5,876,832 A | 3/1999 | Pannell | |
| 5,902,756 A * | 5/1999 | Aly et al. | 442/239 |
| 5,916,469 A | 6/1999 | Scoles et al. | |
| 5,935,475 A | 8/1999 | Scoles et al. | |
| 5,935,680 A | 8/1999 | Childress | |

(Continued)

Primary Examiner—Melvin Mayes (57) ABSTRACT

A composite structure (62) having a bond enhancement member (76) extending across a bond joint (86) between a ceramic matrix composite (CMC) material (80) and a ceramic insulation material (82), and a method of fabricating such a structure. The bond enhancement member may extend completely through the CMC material to be partially embedded in a core material (84) bonded to the CMC material on an opposed side from the insulation material. A mold (26) formed of a fugitive material having particles (18) of a bond enhancement material may be used to form the CMC material. A two-piece mold (38, 46) may be used to drive a bond enhancement member partially into the CMC material. A compressible material (56) containing the bond enhancement member may be compressed between a hard tool (60) and the CMC material to drive a bond enhancement member partially into the CMC material. A surface (98) of a ceramic insulation material (92) having a bond enhancement member (96) extending therefrom may be used as a mold for laying up a CMC material.

15 Claims, 6 Drawing Sheets

U.S. PATENT DOCUMENTS

| | | |
|---|---|---|
| 5,958,550 A | 9/1999 | Childress |
| 5,980,665 A | 11/1999 | Childress |
| 5,985,470 A | 11/1999 | Spitzberg et al. |
| 6,013,592 A * | 1/2000 | Merrill et al. ................. 501/80 |
| 6,027,798 A | 2/2000 | Childress |
| 6,190,602 B1 | 2/2001 | Blaney et al. |
| 6,280,584 B1 | 8/2001 | Kumar et al. |
| 6,291,049 B1 | 9/2001 | Kunkel et al. |
| 6,316,048 B1 * | 11/2001 | Steibel et al. ................ 427/180 |
| 6,342,272 B1 * | 1/2002 | Halliwell .................... 427/447 |
| 6,451,416 B1 | 9/2002 | Holowczak et al. |
| 6,485,791 B1 * | 11/2002 | Nagaraj ....................... 427/452 |
| 6,541,134 B1 * | 4/2003 | Strangman et al. ......... 428/698 |
| 6,777,093 B1 * | 8/2004 | Ojard et al. ................. 428/448 |
| 6,787,195 B2 * | 9/2004 | Wang et al. ................. 427/452 |
| 2002/0004142 A1 | 1/2002 | Ritter et al. |
| 2002/0004143 A1 | 1/2002 | Hasz et al. |
| 2002/0009609 A1 | 1/2002 | Ritter et al. |
| 2003/0003328 A1 * | 1/2003 | Spitsberg et al. ........... 428/698 |
| 2003/0129338 A1 * | 7/2003 | Cairo ........................ 428/36.1 |
| 2003/0203224 A1 * | 10/2003 | DiConza et al. ............ 428/472 |

* cited by examiner

BOND ENHANCEMENT FOR THERMALLY INSULATED CERAMIC MATRIX COMPOSITE MATERIALS

BACKGROUND OF THE INVENTION

U.S. Pat. No. 6,013,592 describes high temperature insulation for ceramic matrix composite (CMC) materials. Such insulation is typically bonded to the CMC material using a high temperature ceramic-based adhesive.

U.S. Pat. No. 6,541,134 describes a bond coating applied between a CMC material and an insulating/abradable material. Entrapped ceramic particles are used to roughen the surface of the bond coating in order to enhance the bond between the bond coating and the insulating/abradable material.

U.S. Pat. No. 4,875,616 describes a high strength bond between ceramic and metal shapes. The bond is formed by pressure bonding a ceramic preform to the metal after the preform has been impregnated with metal.

Each of the aforementioned patents is incorporated by reference herein.

SUMMARY

A method of fabricating a composite structure is described herein as including: partially embedding a bond enhancement element into a ceramic matrix composite material; and applying a ceramic coating to the ceramic matrix composite material over that portion of the bond enhancement element not embedded in the ceramic matrix composite material. A product formed by this method is also described.

A method of fabricating a composite structure is further described as including: forming a ceramic insulation material having a bond enhancement member partially embedded within and partially extending beyond a surface of the ceramic insulation material; and using the surface of the ceramic insulation material as a mold for forming a ceramic matrix composite material to embed the portion of the bond enhancement member that extends beyond the surface of the ceramic insulation material.

A method of fabricating a composite structure is further described as including: forming a ceramic matrix composite substrate by laying up a plurality of layers of ceramic fibers and infusing a ceramic matrix material into the fiber layers; forming a plurality of bond enhancement elements as waves on a top surface of the ceramic matrix composite substrate by inserting solid shapes between layers of the ceramic matrix composite substrate; and forming a ceramic coating on the top surface of the ceramic matrix composite substrate to mechanically engage the bond enhancement elements.

DETAILED DESCRIPTION OF THE INVENTION

The performance of an insulated ceramic matrix composite (CMC) material may be limited by the performance of the bond between the insulation and the structural CMC material. The present inventors find that the surface of a typical CMC material may contain excess matrix material that is relatively weak and that may be weakly bonded to the reinforcing fibers. Thus, a bond to the surface layer of matrix material, however strong, may be limited to the strength of the matrix material or to the strength of the bond between the matrix material and the reinforcing fibers.

The prior art method of bonding a metal to a ceramic that is described in U.S. Pat. No. 4,975,616 is not useful for improving the bond strength of an insulated CMC material such as the material of U.S. Pat. No. 6,013,592. The method of the '616 patent depends upon the infiltration of molten metal into a ceramic preform. The infiltrated metal provides strength across the bond by mechanically interacting with the reinforcing fibers of the preform. However, the insulated CMC material of the '592 patent relies upon ceramic fibers for structural strength. Such fibers are coarse and cannot be infiltrated into an adjacent fiber preform. Accordingly, the use of a preform to bond the two materials of the '592 patent would still result in a layer of non-reinforced ceramic material between the preform and the CMC material. Furthermore, the ceramic spheres contained in the insulation material of the '592 patent are also coarse and would not easily infiltrate into a preform. Thus, a second layer of non-reinforced ceramic material would be created between the preform and the insulation material. Accordingly, the method of the '616 patent when applied to an insulated CMC material would result in a bond that is potentially weaker than such a bond without the use of an intermediate fibrous preform.

The present invention provides a reinforced bond joint between a CMC material and an overlying layer of ceramic material by disposing a bond enhancement element or member across the bond plane to mechanically interact with both the CMC reinforcing fibers and the overlying ceramic material. The overlying ceramic material may be an environmental and/or thermal insulating material. Reinforcing elements have been used within epoxy/fiber composite structures and between two such composite structures, for example as shown in U.S. Pat. No. 5,589,015. The present inventors have innovatively extended that concept by using a bond enhancement member to span and to reinforce the bond joint between a structural CMC material and a protective over-layer of ceramic thermal insulation material. The bond enhancement member provides mechanical support across the bond surface by extending into the CMC material and into the insulation material to respective depths sufficient to distribute and to mitigate the bond joint shear and tensile loads. For a material such as described in the '592 patent, the present invention provides a structural member that provides a mechanical link between the fibers of the CMC material and the spheres of the insulation material without relying exclusively upon the shear strength of a layer of non-reinforced ceramic material.

Figure 1:
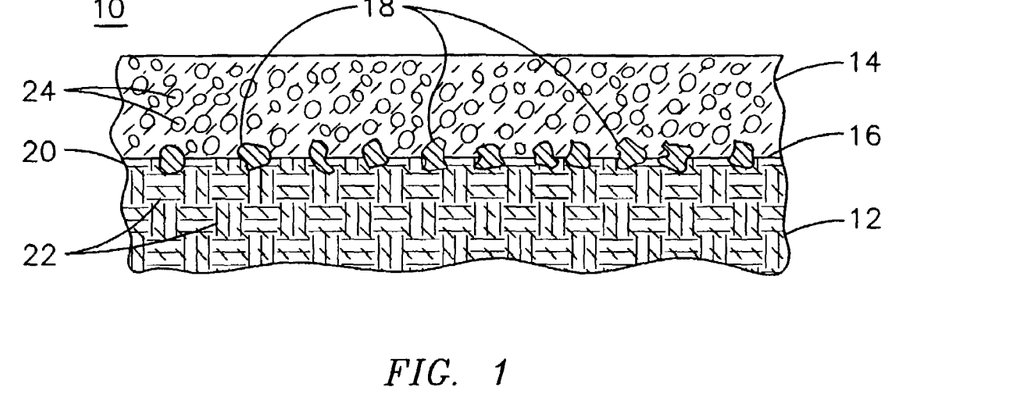
FIG. 1 is a partial cross-sectional view of a composite material including a ceramic material bonded to a ceramic matrix composite substrate along a bond joint that is reinforced by a plurality of bond enhancement particles partially embedded in the ceramic matrix composite material and partially embedded in the insulation material.

One embodiment of the present invention is illustrated in FIG. 1 where a composite material or structure 10 is formed of a layer of ceramic matrix composite (CMC) material 12 bonded to a layer of ceramic thermal insulation material 14 along a bond joint 16. The bond joint 16 is reinforced by a plurality of bond enhancement members such as particles 18 of a bond enhancement material that are partially embedded in the CMC material 12 and partially embedded in the insulation material 14 to span across bond joint 16. The bond enhancement members are illustrated in FIG. 1 as having random particle shapes, however, other shapes may be used, for example rod, plate, Z, T, J, L, S or I shapes. The bond enhancement particles 18 extend through the thin uppermost layer 20 of non-reinforced CMC material 12 to mechanically interact with the reinforcing fibers 22 of the CMC material 12, and they extend into the insulation material 14 to mechanically interact with the ceramic spheres 24 of the insulation material 14.

The CMC material 12 may be any such material known in the art, including but not limited to oxide/oxide (such as A-N720 material from COI Ceramics) and non-oxide/non-oxide ceramic materials. The ceramic insulation or coating material 14 may be any such material known in the art, including but not limited to the high temperature insulation described in the '592 patent. The bond enhancement element material particles 18 may be any material compatible with the surrounding materials and the expected operating environment and having sufficient mechanical strength to carry the expected mechanical loads across the bond joint 16. The particles 18 may be formed of the same material as the spheres 24, for example mullite, alumina or stabilized zirconia in particular embodiments. For the insulated CMC material described in the '592 patent where the spheres may range in size from 0.1 to 1.5 mm, the bond enhancement particles 18 may have a size range of 0.2 to 1.25 mm. Maintaining the particles 18 to have an average size smaller than the average size of the spheres 24 will facilitate the mechanical-interaction between the particles 18 and the spheres 24 since the particles 18 will tend to fit between adjacent spheres 24.

Figure 2A:
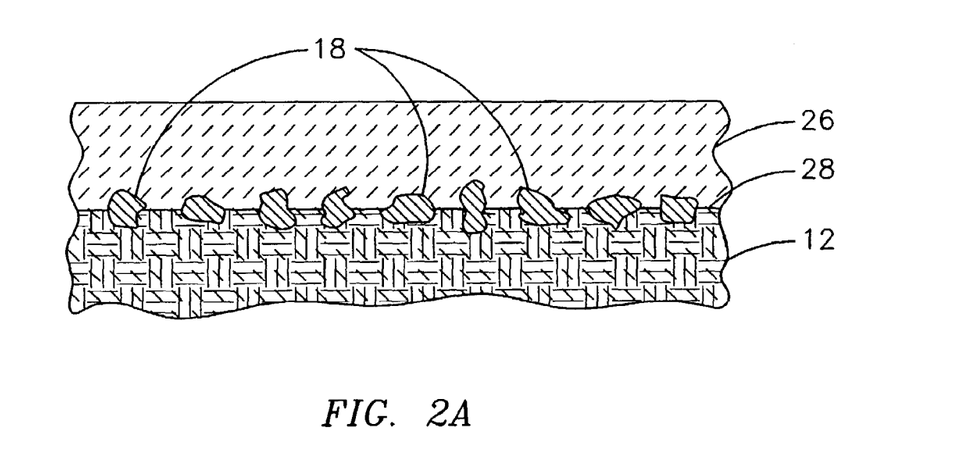
FIGS. 2A and 2B are partial cross-sectional views of a mold formed of a fugitive material used in a process of fabricating the composite material of FIG. 1.
Figure 2B:
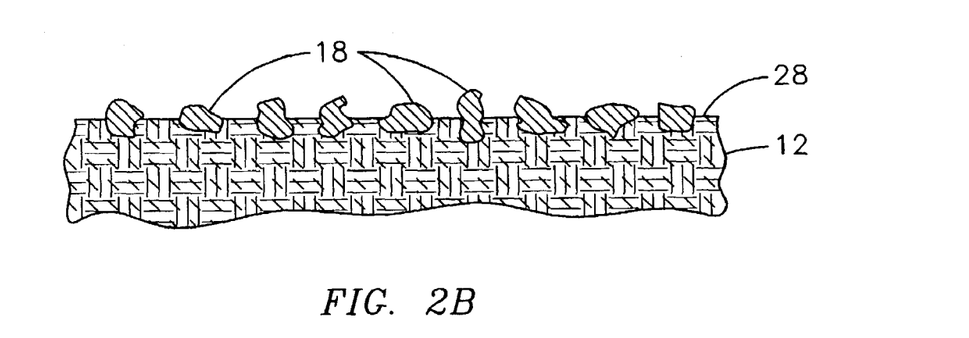

The present invention includes the method for fabricating a composite structure to have a bond enhancement member 18 extending across the bond 16 between a CMC material 12 and an overlying ceramic insulation material 14. FIGS. 2A and 2B illustrate selected steps of a method of fabricating such a composite structure. First, a tool 26 is formed of a fugitive material. The term fugitive material includes any material that is removed during a subsequent processing step by evaporation, melting, disintegration, etc. In the process illustrated in FIGS. 2A and 2B, the fugitive material may be a polymer or other material having an evaporation temperature below a temperature used in subsequent processing steps to cure a ceramic material. The tool 26 is formed to have a plurality of bond enhancing particles 18 partially embedded into a tool surface 28. This may be accomplished by any of a variety of methods, such as by depositing the particles 18 into a mold and then pouring the fugitive material in a liquid state into the mold over the particles 18 to form tool 26. Once the tool 26 with partially embedded particles 28 is formed, the layer of CMC material 12 is applied to surface 28 as a wet pre-preg, thereby covering the partially exposed particles 18 with the uppermost laminates of the CMC material 12. Vacuum bagging or other pressure technique is then used to consolidate the CMC material 12 against the tool 26, thereby embedding the exposed portions of particles 18 into the CMC fabric. The CMC material 12 is then dried and bisque fired or-fully fired at a temperature that is sufficiently high to remove the fugitive material of tool 26, leaving the CMC material 12 and the partially embedded bond enhancement particles 18 for use as a mold for casting a layer of ceramic insulation material 14. The resulting structure is the composite material 10 of FIG. 1 wherein the bond enhancement particles 18 are partially embedded in the CMC material 12 and partially embedded in the insulation material 14 across the bond joint 16.

Figure 3:
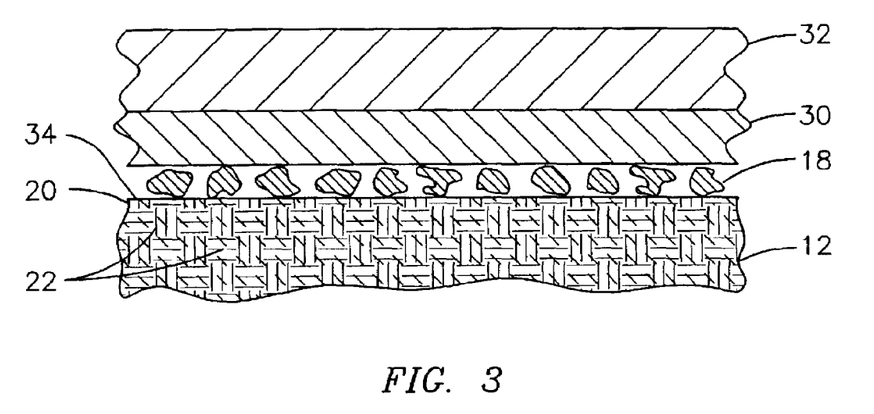
FIG. 3 is a partial cross-sectional view of hard tool being used to apply pressure between a release ply and a layer of CMC material in order to partially embed bond enhancement particles into the CMC material.

FIG. 3 illustrates alternative steps for fabricating the composite material 10 of FIG. 1. A topmost ply of a layer of CMC material 12 is covered with a monolayer of bond enhancement particles 18. A mold release material 30 is applied between the CMC material 12 and hard tool 32. When pressure is applied against the CMC material 12 by the hard tool 32, the particles 18 are partially embedded into the CMC material 12. The thickness and compressibility of the release material 30 will determine the extent to which the particles 18 are embedded and the extent to which they remain partially exposed above the surface 34 of the CMC material. The release material 30 is selected to ensure that the particles are embedded through the topmost layer of non-reinforced ceramic material 20 to mechanically engage the reinforcing fibers 22. Once the hard tool 32 and release material 30 are removed, a layer of ceramic insulation material is applied to surface 34 to embed the exposed portions of the particles 18, thereby creating the composite material 10 of FIG. 1. The release material 30 may be a combination of bleeder plies and release plies. One such release material 30 is a polymer-coated fiberglass.

The monolayer of particles 18 may be applied to the CMC material prepreg 12 by a variety of methods, including the use of a tape cast layer (e.g. a slurry of ceramic material mixed with a plasticizer) or a pepper pot for mechanically distributing the particles 18 over the surface 34. In lieu of the hard tool 32 and release material 30, the particles 18 may be forced into the CMC material 12 by a simple vacuum bagging operation wherein the vacuum bag is placed directly onto the layer of particles 18.

Figure 4A:
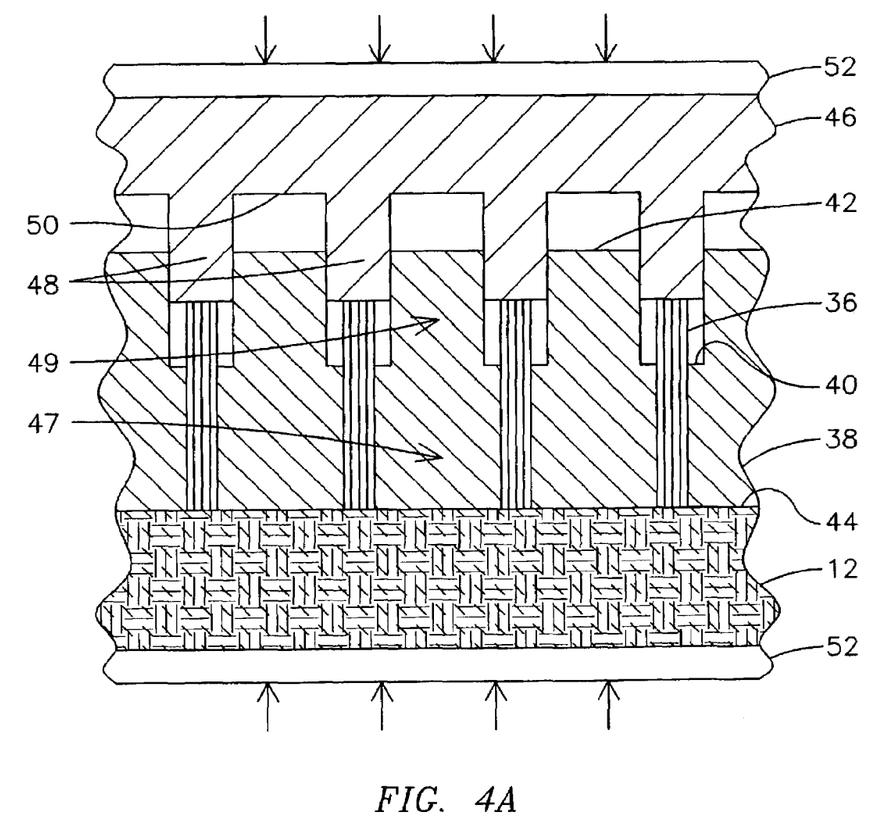
FIGS. 4A and 4B are partial cross-sectional views of a tool being used to partially embed rod-shaped bond enhancing members into a layer of CMC material.
Figure 4B:
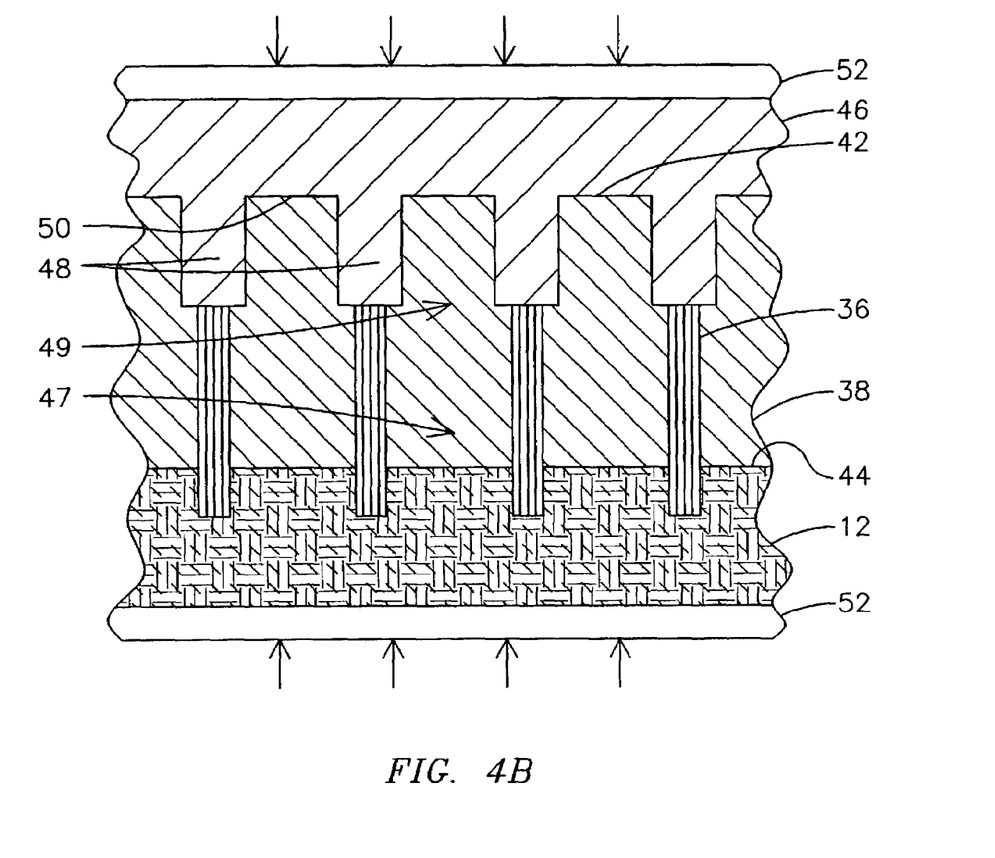

When the bond enhancement member is selected to have a generally linear shape such as a rod or bundle of fibers, it may be necessary to provide lateral support to the bond enhancement member as it is being forced into the layer of CMC material. FIGS. 4A and 4B illustrate one such embodiment where bond enhancement members are formed as a plurality of fiber rods 36 having a generally columnar shape. The ends of rods 6 are illustrated as being generally squared, however, in other embodiments they may be tapered, pointed, rounded or otherwise shaped to facilitate their insertion into the CMC material 12. Two-piece hard tooling includes a lower tool 38 containing openings 40 extending through a thickness of the lower tool 38 from a pressure surface 42 to a work piece surface 44. An upper tool 46 includes drive elements 48 extending from an upper tool pressure surface 50. The drive elements 48 are each formed to have a width dimension sufficiently small to allow the drive elements 48 to fit into an upper portion 49 the respective lower tool openings 40. The bond enhancement rod elements 36 are inserted into the lower tool openings 40 and the work piece surface 44 is positioned onto the CMC prepreg material 12. The upper tool and the lower tool are aligned so that the drive elements 48 extend into the lower tool openings 40 to make contact with the rods 36. The upper tool 46 is then urged against the lower tool 38 to drive the bond enhancement rod elements 36 partially into the ceramic matrix composite material 12. This force may be applied by using a vacuum bag 52 for example. FIG. 4B illustrates the assembly after the rods 36 have been partially driven into the CMC material 12 and the upper tool 46 pressure surface 50 has made contact with the lower tool pressure surface 42. At this point, work piece surface 44 is exerting a consolidation force to the ceramic matrix composite material, but no further insertion of the rods 36 can be accomplished, thereby leaving the rods 36 partially embedded into the CMC material 12 and partially exposed for receiving a subsequently applied layer of ceramic insulation material. In one embodiment the rods 36 may extend at least 0.5 mm into the CMC material 12 and at least 0.5 mm into the overlying insulation material. The openings 48 in the upper tool 46 may include a lower portion 47 sized to receive the rods 36 with a slight interference fit to simplify the loading of the rods 36 into the lower tool 46. An upper portion 49 of the openings 48 may have a larger width/diameter than the lower portion 47 with the drive elements 48 being sized accordingly. This arrangement will allow the drive elements 48 to "bottom out" in the upper portion 49, thereby providing a further mechanism for limiting the extent to which the rods 36 can be driven into the CMC material 12.

The rods 36 may be a single crystal material such as sapphire or a monolithic ceramic such as mullite, alumina, stabilized zirconia or garnet, etc. Alternatively, the rods 36 may be constructed as a fiber bundle. The rods 36 may be pultruded fiber tows that are resin reinforced or stiffened by pre-firing with a matrix material. The upper tool 46 and lower tool 38 may be made of a metal or metal alloy.

Figure 5A:
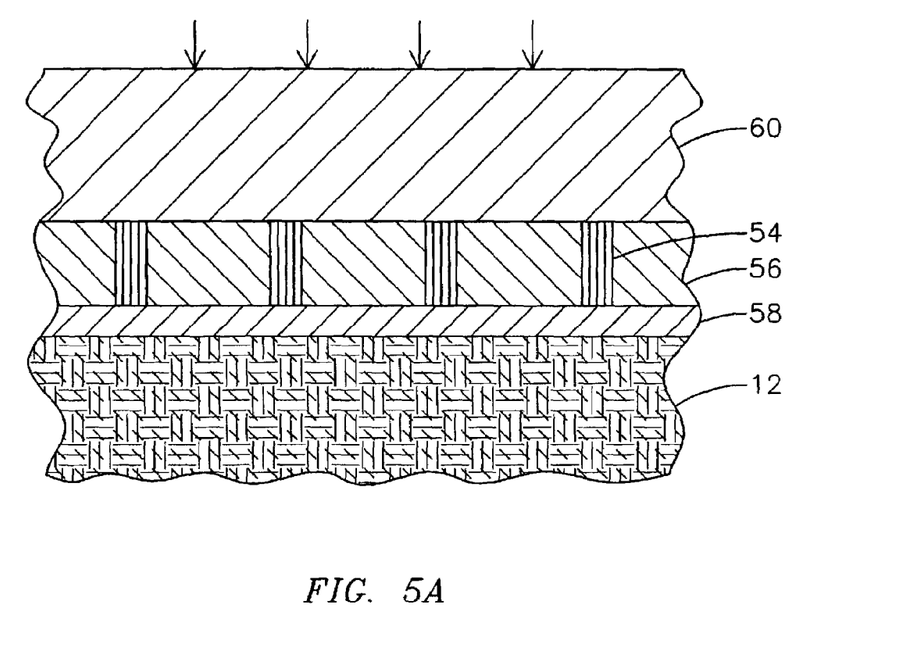
FIGS. 5A and 5B are partial cross-sectional views of a tool being used with a layer of compressible material in order to partially embed rod-shaped bond enhancing members into a layer of CMC material.
Figure 5B:
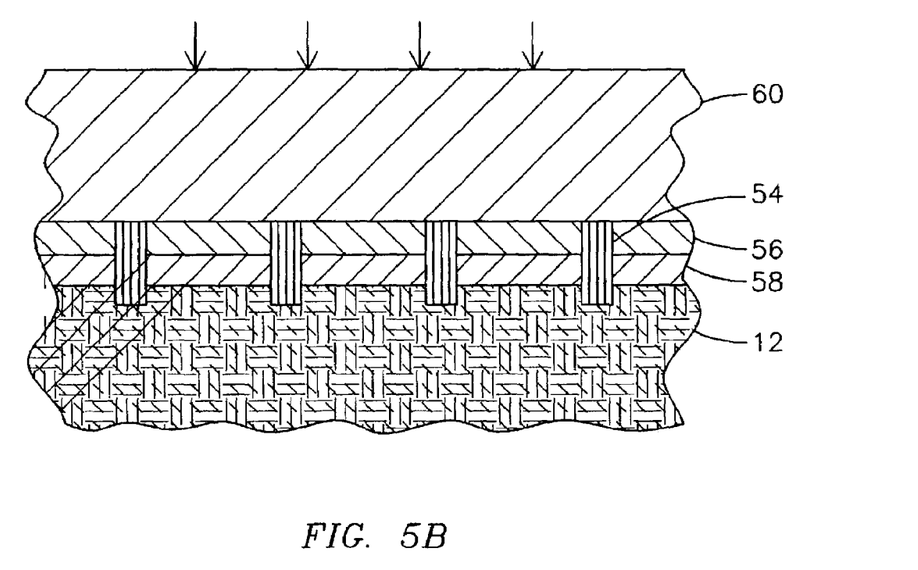

FIGS. 5A and 5B illustrate another embodiment for partially embedding a bond enhancement member 54 into a layer of CMC material 12. In this embodiment, a compressible material 56 such as a layer of foam material is fabricated around bond enhancement members 54. The compressible material 56 may be an elastomeric substance, for example. Examples of compressible/compactable materials are described in U.S. Pat. No. 5,466,506, incorporated by reference herein. The foam material 56 and entrapped bond enhancement members 54 and a layer of a mold release material 58 are positioned between a hard tool 60 and a CMC prepreg material 12. As pressure is applied by the hard tool 60 to consolidate the CMC prepreg material 12, the compressible material 56 is compressed and the bond enhancement members 54 are forced into the CMC material 12. The extent to which the bond enhancement members 54 are embedded into the CMC material 12 will depend primarily upon the thickness and compressibility of the compressible material 56 and the thickness of the mold release material 58. The material properties and dimensions are selected to provide a desired depth of penetration of the bond enhancement members 54 into the CMC material 12.

Bond enhancement elements may be inserted into a layer of CMC material by forming an opening in the CMC material after it has been processed to a bisque fired stage, or the bond enhancement elements may be inserted into the CMC material when the CMC material is in a wet prepreg stage or in a dry perform stage prior to the infiltration of matrix material.

Figure 6:
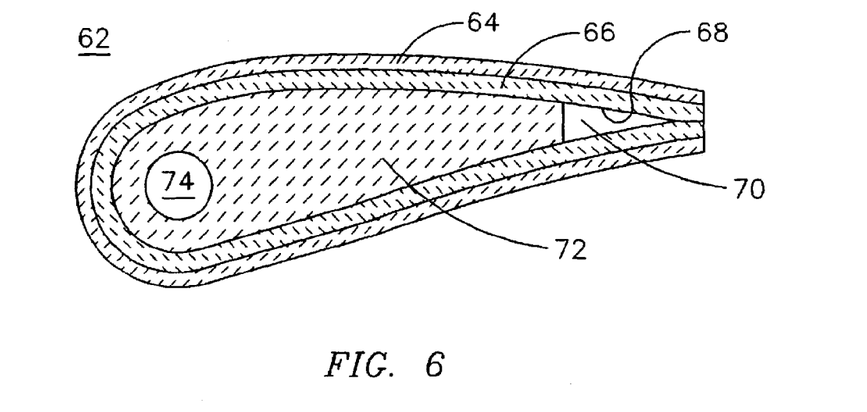
FIG. 6 is an airfoil member for a gas turbine engine having layers of ceramic insulation, ceramic matrix composite material, and ceramic core material interlocked by bond enhancement members.

The present concept of a bond enhancement member may also be applied in applications where a CMC material is bonded to a ceramic thermal insulation material on one side and to a second material on a second side. The gas turbine engine vane 62 of FIG. 6 is one example of such an embodiment. An outer layer of ceramic thermal insulation 64 defines an airfoil shape and is mechanically supported by an underlying layer of CMC material 66. The CMC material 66 has an inside surface 68 that defines a core region 70. Core region 70 is partially filled with a ceramic core material 72. The core material 72 may further define an interior-cooling passageway 74. The method and apparatus of the present invention are useful for effectively locking the material, layers of such a structure together, as may be more fully appreciated by viewing FIG. 7, which is a partial cross-sectional view through a portion of the airfoil member of FIG. 6. Bond enhancement members 76 extend through respective openings 78 formed in CMC material layer 80. The bond enhancement members 76 have opposed ends embedded within ceramic insulation layer 82 and core material layer 84. The shape of the bond enhancement members 76 is selected to facilitate installation and mechanical connection with the surrounding material. The bond enhancement members 76 may be inserted through the layers of CMC material 80 as the wet prepreg CMC material 80 is first being formed, with the bond enhancement members 76 passing through the thickness of the CMC material 80 to extend beyond both opposed sides. Special prepreg lay-up tooling may be required to allow the bond enhancement members 76 to pass through the CMC material 80 and to be extracted on the opposite side, such as by forming holes in the tool to receive the portion of the bond enhancement members 76 extending beyond the CMC material 80. The CMC material 80 may then be bisque or fully fired with the bond enhancement member 76 in place. The insulation material 82 and core material 84 are then cast onto the CMC material 80 around the respective opposed protruding ends of the bond enhancement members 76.

Figure 7:
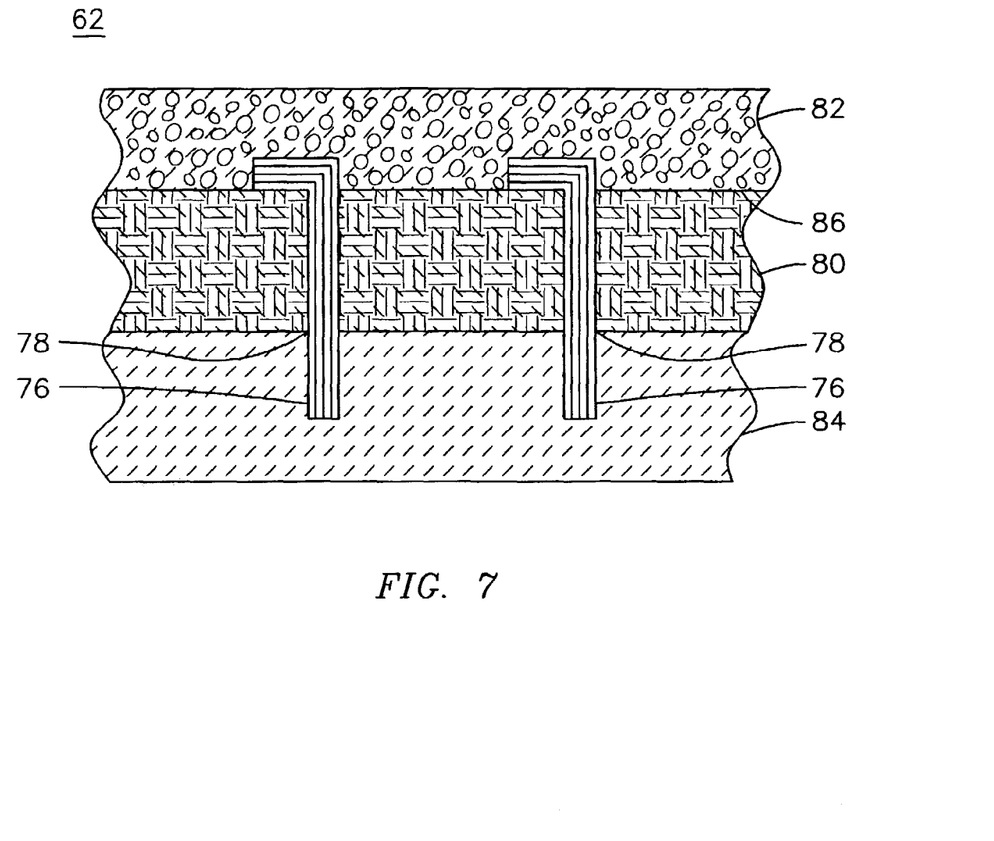
FIG. 7 is a partial cross-sectional view of the airfoil member of FIG. 6 illustrating the bond enhancement members extending through the entire thickness of the CMC material layer to provide mechanical attachment to both the insulation layer and the core material.

Alternatively, the CMC material 80 may be bisque or fully fired prior to the installation of the bond enhancement members 76. The openings 78 for receiving the bond enhancement members 76 may be formed into the fired CMC material 80 by laser cutting, drilling, die pressing, or other known material removal process. The bond enhancement members 76 are then installed to protrude beyond both sides of the CMC material 80, and the insulation material 82 and core material 84 are then formed thereon. The firing of the respective layers 80, 82, 84 and the bond enhancement members 76 may be controlled so that the shrinkage of the bond enhancement members 76 provides a desired amount of compression at the bond joint 86.

Figure 8:
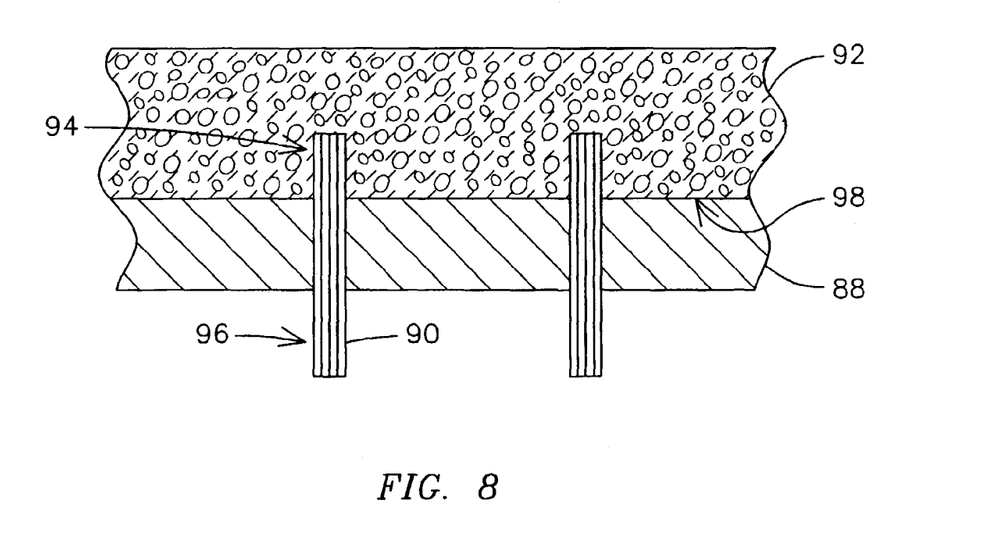
FIG. 8 is a partial cross-sectional view of a mold used to cast a ceramic material to partially embed a bond enhancement member.

One may appreciate that a composite CMC/ceramic insulation material may also be formed by first forming the ceramic insulation material and then using the insulation material as a mold for forming the CMC material. A bond enhancement member may be disposed across the bond joint in such a composite material by forming the insulation material to partially embed the bond enhancement member. A special mold 88 may be needed to position and to secure the bond enhancement member 90 as the insulation material 92 is cast around the embedded portion 94 of the bond enhancement member, as shown in FIG. 8. An exposed portion 96 of the bond enhancement member will remain extending beyond the surface 98 of the insulation material. Surface 98 functions as the mold for the CMC material. The wet prepreg CMC material is then be laid up over the insulation material surface 98 to embed the exposed portion 96 of the bond enhancement member. Such a process may be used to form the composite material 10 of FIG. 1, for example. Alternatively, particles 18 of bond enhancement material may be affixed to a surface of a mold used to cast the ceramic insulation material 14. Alternatively, the particles 18 may be partially embedded into the ceramic insulation material 14 by applying pressure there between before the ceramic insulation material 14 is fully dried or fully cured. Alternatively, a mold 26 formed of fugitive material having particles 18 embedded therein, as described above with respect to FIG. 2, may be used to cast the ceramic insulation material.

Figure 9:
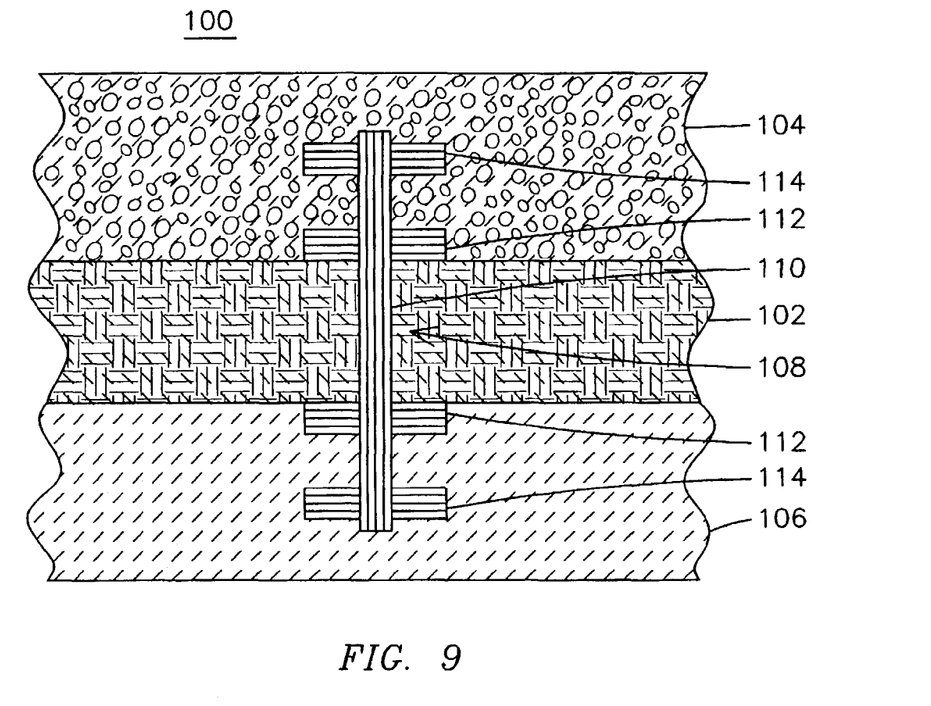
FIG. 9 is a partial cross-sectional view of a multi-layer component containing a cruciform-shaped bond enhancement member.

FIG. 9 is a partial cross-sectional view of a gas turbine component 100 having a layer of structural CMC material 102 insulated on a hot side by a layer of ceramic insulation 104 and further abutted by a layer of ceramic core material 106 on a cold side. The three layers may be joined by adhesives and/or by co-processing to form a sinter bond between respective mating surfaces. Alternatively or in addition to other joining mechanisms, a cruciform-shaped bond enhancement structure 108 is positioned to be partially embedded in each of the three layers 102, 104, 106. Bond enhancement structure 108 contains a first element 110 that extends across the respective abutting surfaces of the layers, opposed second elements 112 abutting opposed surfaces of the layer of CMC material 102, and opposed third element 114 proximate opposed ends of the first element 110 and surrounded by the respective layers 104, 106. Each of these elements 110, 112, 114 may be formed with layers of ceramic fibers filled with a ceramic matrix material and bisque-fired fired to achieve a desired degree of strength before assembly. The first element 110 is inserted through the CMC layer 102 either before the CMC layer 102 is infused with matrix material (dry) or after the CMC layer 102 is infused with matrix material but before drying and firing (wet). Alternatively, a hole may be formed in the CMC layer 102 after drying and firing to receive the first element 110. Opposed second elements 112 are then installed onto the first element 110 and affixed thereto with adhesive to hold the first element 110 in position. Third elements 114 are then affixed into position with adhesive to permit layers 104,106 to be formed to surround the respective third elements 114. A sinter bond is formed between the bond enhancement structure 108 and the surrounding material during subsequent curing steps.

Figure 10:
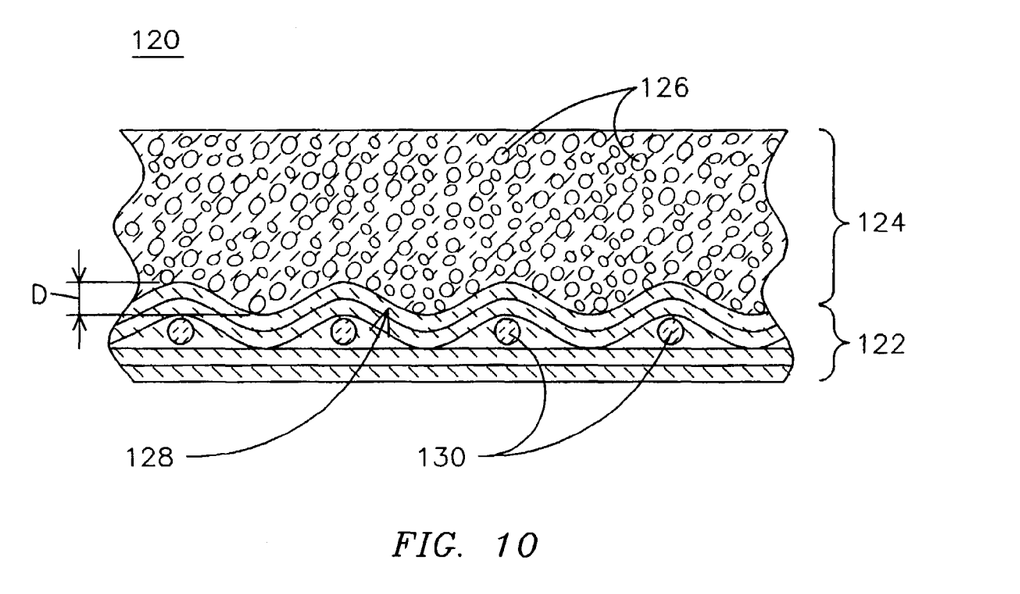
FIG. 10 is a partial cross-sectional view of a layer of CMC material covered by a layer of insulating material wherein a bond enhancement member is formed as waves in an upper surface of the CMC material.

FIG. 10 illustrates a partial cross-sectional view of a component 120 formed of a layer of ceramic matrix composite material 122 coated by a layer of ceramic insulating material 124 containing a plurality of hollow ceramic spheres 126. The insulating material 124 may be similar to the material described in U.S. Pat. No. 6,013,592. The bond between layers 122 and 124 is improved by bond enhancement structures 128 formed as waves in the upper surface of the layer of CMC material 122, thereby providing enhanced mechanical interaction with the insulating material 124. The bond enhancement structures 128 may be formed by inserting solid shapes such as rods 130 between two layers of the CMC material 122 as the CMC material 122 is being laid up. The rods 130 may be a ceramic material that remains in the final component 120 or they may be a fugitive material that will be removed by a subsequent processing steps to leave an empty channel such as may be used for the passage of a cooling fluid. The size of bond enhancement structures 128 may be selected to correlate to the size of the spheres 126 to ensure that at least one sphere 126 is adequately engaged by each bond enhancement structure 128 to carry mechanical loads there between. In various embodiments, the distance D between the top and bottom of the waves of the bond enhancement structures 128 may be approximately equal to the average diameter of spheres 126, or approximately equal to at least one-half the average diameter of spheres 126.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

We claim as are invention:

1. A method of fabricating a composite structure, the method comprising:
    partially embedding a bond enhancement element into a ceramic matrix composite material;
    applying a ceramic coating to the ceramic matrix composite material over that portion of the bond enhancement element not embedded in the ceramic matrix composite material; and
    further comprising forming an opening in the ceramic matrix composite material to receive the bond enhancement element.

2. The method of claim 1, further comprising forming the opening in the ceramic matrix composite material when the ceramic matrix composite material is in a bisque fired stage.

3. The method of claim 1, further comprising co-firing the ceramic matrix composite material and the ceramic coating to interlock the bond enhancement element there between.

4. A method of fabricating a composite structure, the method comprising:
    partially embedding a bond enhancement element into a ceramic matrix composite material;
    applying a ceramic coating to the ceramic matrix composite material over that portion of the bond enhancement element not embedded in the ceramic matrix composite material; and
    further comprising inserting the bond enhancement element into the ceramic matrix composite material when the ceramic matrix composite material is in a dry perform stage prior to infiltration of matrix material.

5. A method of fabricating a composite structure, the method comprising:
    partially embedding a bond enhancement element into a ceramic matrix composite material;
    applying a ceramic coating to the ceramic matrix composite material over that portion of the bond enhancement element not embedded in the ceramic matrix composite material;
    embedding a bond enhancement element into a compressible material; and
    compressing the compressible material between a tool and the ceramic matrix composite material to drive the bond enhancement element partially into the ceramic matrix composite material.

6. A method of fabricating a composite structure, the method comprising:
   partially embedding a bond enhancement element into a ceramic matrix composite material;
   applying a ceramic coating to the ceramic matrix composite material over that portion of the bond enhancement element embedded in the ceramic matrix composite material;
   forming a tool comprising a fugitive material having particles of a bond enhancement material partially embedded on a surface of the tool;
   applying a force between the tool surface and a surface of the ceramic matrix composite material to partially embed the particles of bond enhancement material into the surface of the ceramic matrix composite material; and
   applying heat to at least partially cure the ceramic matrix composite material and to remove the fugitive material, exposing that portion of the particles of bond enhancement material not partially embedded in the surface of the ceramic matrix composite material.

7. A method of fabricating a composite structure, the method comprising:
   partially embedding a bond enhancement element into a ceramic matrix composite material;
   applying ceramic coating to the ceramic matrix composite material over that portion of the bond enhancement element not embedded in the ceramic matrix composite material;
   partially embedding a layer of particles of a bond enhancement material into a surface of a layer of a mold release material; and
   applying a force between the surface of the mold release material and a surface of the ceramic matrix composite material to partially embed the particles of bond enhancement material into the surface of the ceramic matrix composite material.

8. A method of fabricating a composite structure, the method comprising:
   partially embedding a bond enhancement element into a ceramic matrix composite material;
   applying a ceramic coating to the ceramic matrix composite material over that portion of the bond enhancement element not embedded in the ceramic matrix composite material;
   forming a lower tool comprising an opening extending through a thickness of the lower tool from a pressure surface to a work piece surface;
   forming an upper tool comprising a drive element extending from a pressure surface, the drive element sized to fit into the lower tool opening;
   inserting the bond enhancement element into the lower tool opening;
   applying the lower tool work piece surface to a surface of the ceramic matrix composite material;
   aligning the upper tool and the lower tool so that the drive element extends into the lower tool opening; and
   urging the upper tool against the lower tool to drive the bond enhancement element partially into the ceramic matrix composite material.

9. The method of claim 8, further comprising selecting a length dimension of the drive element extending from the upper tool pressure surface so that the bond enhancement element is only partially embedded into the ceramic matrix composite material when the pressure surface of the upper tool contacts the pressure surface of the lower tool.

10. The method of claim 8, further comprising forming the opening in the lower tool to comprise an upper portion comprising a first width dimension proximate the pressure surface and a lower portion comprising a second width dimension smaller than the first width dimension proximate the work piece surface; and
   forming the drive element to have a width dimension between the first width dimension and the second width dimension so that the drive element will bottom out in the upper portion during the step of urging the upper tool against the lower tool.

11. The method of claim 8, further comprising:
   removing the upper tool and the lower tool to expose the bond enhancement element partially embedded into the surface of the ceramic matrix composite material; and
   applying a ceramic thermal insulation material over the surface of the ceramic matrix composite material to embed that portion of the bond enhancement element not embedded into the ceramic matrix composite material.

12. A method of fabricating a composite structure, the method comprising:
   forming a ceramic insulation material having a bond enhancement member partially embedded within and partially extending beyond a surface of the ceramic insulation material; and
   using the surface of the ceramic insulation material as a mold for forming a ceramic matrix composite material to embed the portion of the bond enhancement member that extends beyond the surface of the ceramic insulation material.

13. The method of claim 12, further comprising:
   forming a mold of a fugitive material having particles of a bond enhancement material partially embedded in a surface; and
   using the mold to form the ceramic insulation material to have the bond enhancement particles partially embedded therein.

14. A method of fabricating a composite structure comprising:
   forming a ceramic matrix composite substrate by laying up a plurality of layers of ceramic fibers and infusing a ceramic matrix material into the fiber layers;
   forming a plurality of bond enhancement elements as waves on a top surface of the ceramic matrix composite substrate by inserting solid shapes between layers of the ceramic matrix composite substrate;
   forming a ceramic coating on the top surface of the ceramic matrix composite substrate to mechanically engage the bond enhancement elements; and
   further comprising forming the solid shapes of a fugitive material.

15. The method of claim 14, further comprising:
   forming the ceramic coating to comprise a plurality of ceramic spheres; and
   forming the bond enhancement elements so that a distance between a top and a bottom of the waves is at least one half an average diameter of the spheres.

* * * * *